United States Patent [19]
Townsend

[11] Patent Number: 5,393,097
[45] Date of Patent: Feb. 28, 1995

[54] AUTOMOBILE ARMREST APPARATUS FOR PRESENTING RESTRAINT SYSTEM

[76] Inventor: John A. Townsend, 543 Esplanade, Pacifica, Calif. 94044

[21] Appl. No.: 230,622

[22] Filed: Apr. 21, 1994

Related U.S. Application Data

[63] Continuation-in-part of Ser. No. 912,790, Jul. 13, 1992.

[51] Int. Cl.[6] .............................................. B60R 22/00
[52] U.S. Cl. .................. 280/801.1; 280/808; 297/481
[58] Field of Search ............... 280/801.1, 807, 808; 297/468, 473, 481, 483, 411, 417

[56] References Cited

U.S. PATENT DOCUMENTS

| | | | |
|---|---|---|---|
| 3,623,768 | 11/1971 | Capener | 297/390 |
| 3,833,257 | 9/1974 | Dove | 297/284 |
| 4,179,086 | 12/1979 | Yamada | 244/122 AG |
| 4,431,233 | 2/1984 | Ernst | 297/481 X |
| 4,480,713 | 11/1984 | Macht et al. | 180/268 |
| 4,629,214 | 10/1986 | Föhl | 280/808 |
| 4,681,345 | 7/1987 | Swartout | 280/801 |
| 4,725,076 | 2/1988 | Taylor | 280/808 |
| 5,261,696 | 11/1993 | Hamue | 280/808 |
| 5,263,741 | 11/1993 | Savos et al. | 280/808 |

FOREIGN PATENT DOCUMENTS

| | | | |
|---|---|---|---|
| 3-273959 | 12/1991 | Japan | B60/1. |
| 4-46836 | 2/1992 | Japan | B60/ R21 |

*Primary Examiner*—Kenneth R. Rice
*Assistant Examiner*—Christopher P. Ellis
*Attorney, Agent, or Firm*—Limbach & Limbach

[57] ABSTRACT

A pivotable armrest is disclosed for presenting a seat belt buckle to a vehicle's occupant when the armrest is lowered from an upright retracted position to a lowered working position. The armrest movement may be manually or automatically driven. The armrest is preferably attached to the outboard side of a seat, and is used in conjunction with a conventional shoulder and lap belt arrangement.

7 Claims, 11 Drawing Sheets

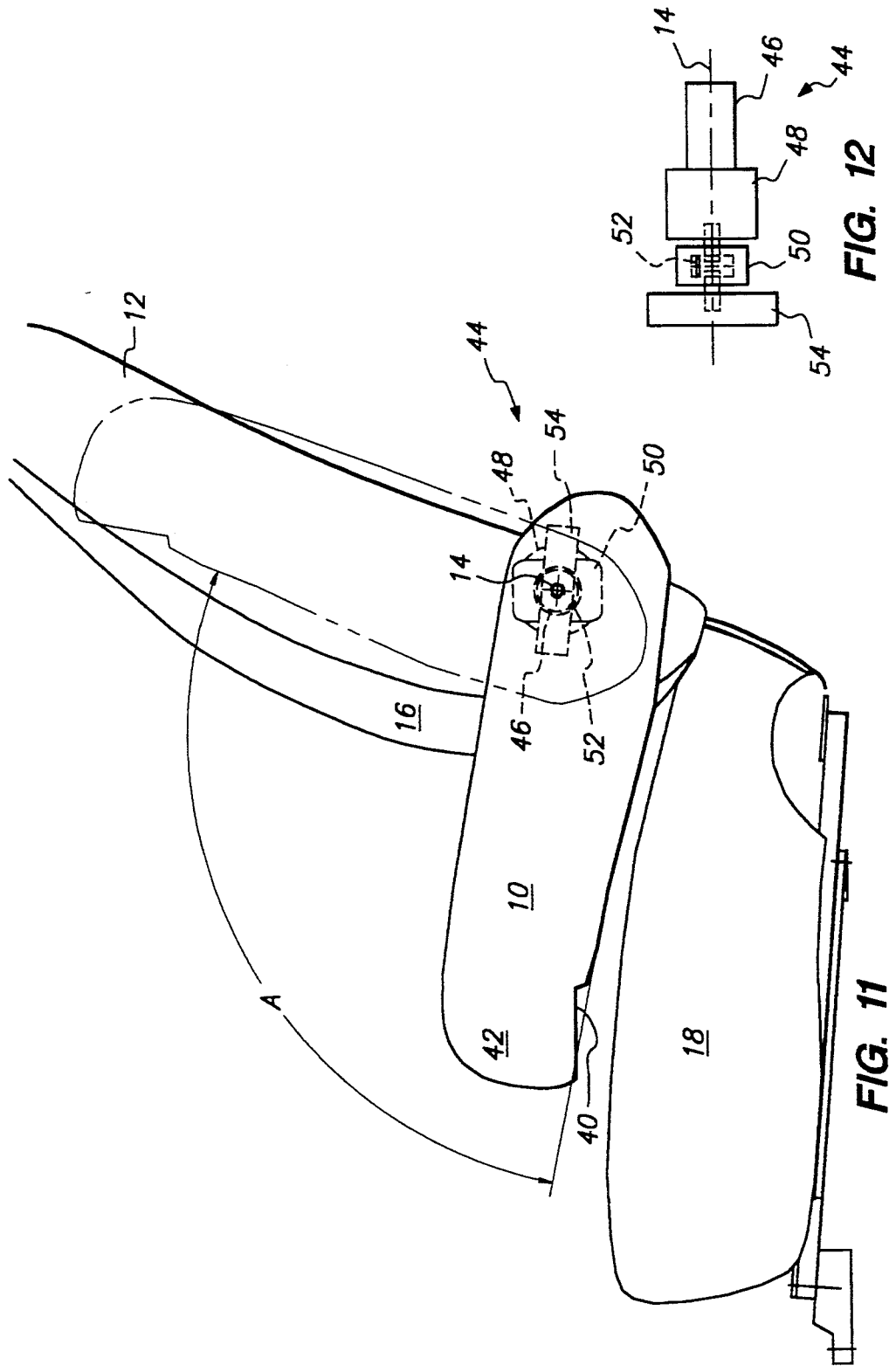

5,393,097

AUTOMOBILE ARMREST APPARATUS FOR PRESENTING RESTRAINT SYSTEM

This is a continuation-in-part application of parent pending application Ser. No. 07/912,790, filed Jul. 13, 1992, by John A. Townsend and entitled IMPROVEMENTS IN SLIDING AUTOMOBILE DOOR.

BACKGROUND OF THE INVENTION

1. Field of the Invention

The present invention relates to restraint systems in vehicles, and in particular to presenting a restraint belt to a vehicle occupant.

2. Discussion of the Prior Art

Even with the advent of inflatable air bag restraint systems, the use of restraint belts, in conjunction with or without air bags, is still required for adequate protection of vehicle occupants during collisions or accidents. The conventional restraint belt has evolved into a combination lap belt and diagonal shoulder belt arrangement, with one continuous belt often being used for both. Both lap belt and shoulder belt protection should be used, even when the vehicle is equipped with air bags and or separate shoulder and lap belts.

In a typical single belt arrangement, one end of the belt is anchored to a structural floor member just behind a seat on the outboard side. When in use, the belt extends upward and forward around the occupant's waist and through a belt buckle. The buckle is releasably secured in a receptacle located adjacent the inboard side of the occupant's waist. Some automobiles do not use a buckle and receptacle arrangement, but secure the belt directly through a latch. In any case, the belt is slidably attached on the inboard side, and extends upward diagonally across the occupant's chest and over his or her outboard shoulder to an anchor point above and behind the occupant on the outboard side. A belt retracting mechanism is usually mounted on or in the 'B' pillar rearward of the front door to take up slack in the belt. In some vehicles the retracting mechanism is mounted on the outboard edge of the ceiling or floor, or in the seat back. When force is exerted on the belt in an accident, the retracting mechanism and the slidable adjustment on in inboard side lock to allow the lap and shoulder portions of the belt to function properly.

When the belt is released from the inboard side, the retracting mechanism draws the belt and buckle towards the outboard side of the vehicle. When not in use, the belt extends from the floor anchor point to the upper anchor point or retracting mechanism. The belt buckle typically hangs on the belt around shoulder or head height of the seated occupant.

Instead of having one continuous belt, some restraint systems employ separate lap and shoulder belts attached to a single buckle. These systems use separate retracting mechanisms for the lap and shoulder belts, but otherwise operate in much the same way as single belt systems. The belt buckle hangs behind the outboard side of the occupant when not in use.

To fasten the seat belt, the occupant typically must first twist around in the seat, look over his or her outboard shoulder, and reach around with his or her inboard hand to grab the belt buckle which is above and behind the seat. This is a difficult movement for the occupant to make. Just turning around far enough to see the seat belt can be awkward, with reaching the belt and drawing it around being even more cumbersome. Because of seat belt geometry and door and window constraints, this buckle positioning and associated occupant movement is difficult to improve upon. With the seat belt so far out of sight and difficult to reach, many people forget or do not bother to wear them.

In attempts to make restraint systems easier to use (or more difficult not to use), automobile manufacturers have recently developed various alternatives or modifications to the conventional seat belt arrangement. However, none of these newer systems are without drawbacks.

One newer type of "passive" restraint system uses separate lap and shoulder belts. The lap belt is of an earlier conventional design, with a retracting mechanism beside the inboard or outboard side of the seat bottom. The shoulder belt is similar to a conventional shoulder belt with one end attached to the inside of the upper rear corner of the door. In many models, this end is detachable. The other end of the shoulder belt is a separate retracting mechanism beside the inboard side of the seat bottom. When the door is fully open, the belt extends from the inboard side of the seat bottom and up and away from the seat to the outer corner of the door. The vehicle occupant is able to enter the vehicle between the shoulder belt and the seat. When the door is closed, the inboard end of the shoulder belt retracts and the outboard end attached to the door is then in a position above and behind the occupant like a conventional shoulder belt. The occupant then fastens the lap belt in a conventional manner. To exit the vehicle, the occupant unbuckles the lap belt and opens the door, and is able to exit through the door opening.

The above-described passive restraint system has the advantage of automatically fastening and unfastening the shoulder belt when the door is closed or opened, and eliminates the need for the occupant to twist around in the seat to reach for the seat belt. However, the belt extending from the open door limits the room available to enter and exit the vehicle and usually is a hinderance. Passengers find it awkward to enter and exit vehicles having such restraint systems, especially when using them for the first time.

To provide more room to enter and exit a vehicle and to make such actions more natural, another type of restraint system has been developed. Instead of attaching the outboard end of the shoulder belt to the upper rear end of the door, the belt is attached to a movable shuttle riding in a track along the upper periphery of the door opening. When the door is opened, the shuttle automatically moves the outboard end of the shoulder belt forward along the track, and in some cases partially down the 'A' pillar adjacent the side of the windshield. This allows the occupant more room to enter and exit the vehicle without becoming entangled in the shoulder belt. When the occupant is seated and closes the door, the shuttle automatically drives the end of the shoulder belt rearward, and in some instances partially down the 'B' pillar, into an operational position. With this system, the occupant must still manually fasten the lap belt. This system, however, adds more complexity and cost to a vehicle due to the electric motors, drive mechanisms, and controls that are needed for the system to function. The system takes up more space where structural members may be needed. The system also increases the possibility of malfunctions requiring repair or preventing the occupant from being able to use the shoulder belt.

Both of the newer types of restraint systems described above tend to confuse users. Many people feel uncomfortable being automatically strapped in, especially when a shuttle and belt move toward their head unexpectedly. Many occupants bypass the automatic features of these systems by unbuckling the outboard end of the shoulder strap when exiting the vehicle, and buckling it in when they re-enter and close the door. Worse yet, some frustrated occupants dispense from using the restraint belt or belts altogether, and are even tempted to disconnect devices designed to encourage or require the use of seat belts.

Probably the biggest drawback to the "passive" systems is that they still require the occupant to fasten the lap belt him or herself. Many occupants rely on the automatic restraint belt features to strap them in and do not realize that the lap belt has not been fastened for them. Others simply forget to fasten the lap belt, or choose not to do so when traveling short distances. Wearing the shoulder belt without the lap belt can be just as dangerous as wearing no belt at all, and in many circumstances is much more dangerous. Without a lap belt to secure the occupant's waist and lower body in the seat, this portion of the body can fly forward in an accident. This allows the shoulder belt to slip upward on the occupants body. The occupant may slip completely out of the shoulder belt and then be unrestrained, or the shoulder belt may catch under the occupant's chin and cause serious neck injury or decapitation. By automatically securing the shoulder belt while not ensuring that the lap belt is fastened, these newer restraint systems often place a vehicle's occupants in a very dangerous position.

What is needed, and what the prior art lacks, is a simple, inexpensive way of allowing a vehicle's occupants to see and conveniently reach their seat belts so they can fasten them without having to twist around and reach behind them while attempting to locate their seat belts.

SUMMARY OF THE INVENTION

In accordance with one aspect of the present invention, a pivotally mounted armrest is provided that presents a restraint belt buckle to a vehicle's occupant in a convenient position when the armrest is moved from a upright position to a lowered position.

In the preferred embodiment, the belt buckle is located in a detent position at the lower forward inboard end of the armrest when the armrest is in the lowered position. The occupant is able to see the belt buckle and is able to easily grasp it to pull it around for fastening. When the belt is unbuckled and the armrest is raised to an upright position beside the seat back, the buckle automatically returns to the detent position. The buckle is presented when the armrest is again lowered.

In the preferred embodiment, the armrest is pivotally mounted to the outboard side of the seat. Advantages to an outwardly located armrest being attached to the seat, as opposed to being attached to the door, are disclosed in the pending parent application to this continuation-in-part application Ser. No. 07/912,790, filed Jul. 13, 1992 by John A. Townsend and entitled IMPROVEMENTS IN SLIDING AUTOMOBILE DOOR. These advantages include being able to optimally locate the armrest with respect to the occupant, regardless of the adjustable positioning of the seat. This is important not only when using the armrest to support the occupant's arm, but also when optimally positioning a side air bag, located in the armrest, for deployment during a side impact. The location of the armrest on the outboard side of the seat also has several advantages when used in conjunction with a vertically sliding door, the subject of the parent application.

In accordance with another aspect of the present invention, the pivoting motion of the inventive armrest is controlled automatically. When the door is opened and the occupant has removed the seat belt, the armrest is automatically driven upward into an upright and retracted position beside the seat back. When the door is closed, the armrest is automatically driven downward into a lowered and working position, and the seat belt buckle is presented to the occupant.

BRIEF DESCRIPTION OF THE DRAWINGS

FIG. 11 is a side elevational view showing the range of motion of the inventive armrest and an automatic drive mechanism.

FIG. 12 is a schematic view of the automatic drive mechanism.

DETAILED DESCRIPTION OF THE PREFERRED EMBODIMENTS

Referring to FIGS. 1 through 8, an example of the inventive armrest 10 is shown in conjunction with a driver's seat 12. Installation of the armrest on a passenger seat would result in mirror-images of these figures. The armrest can also be used in a similar manner with the rear seats of a vehicle.

Figure 1:
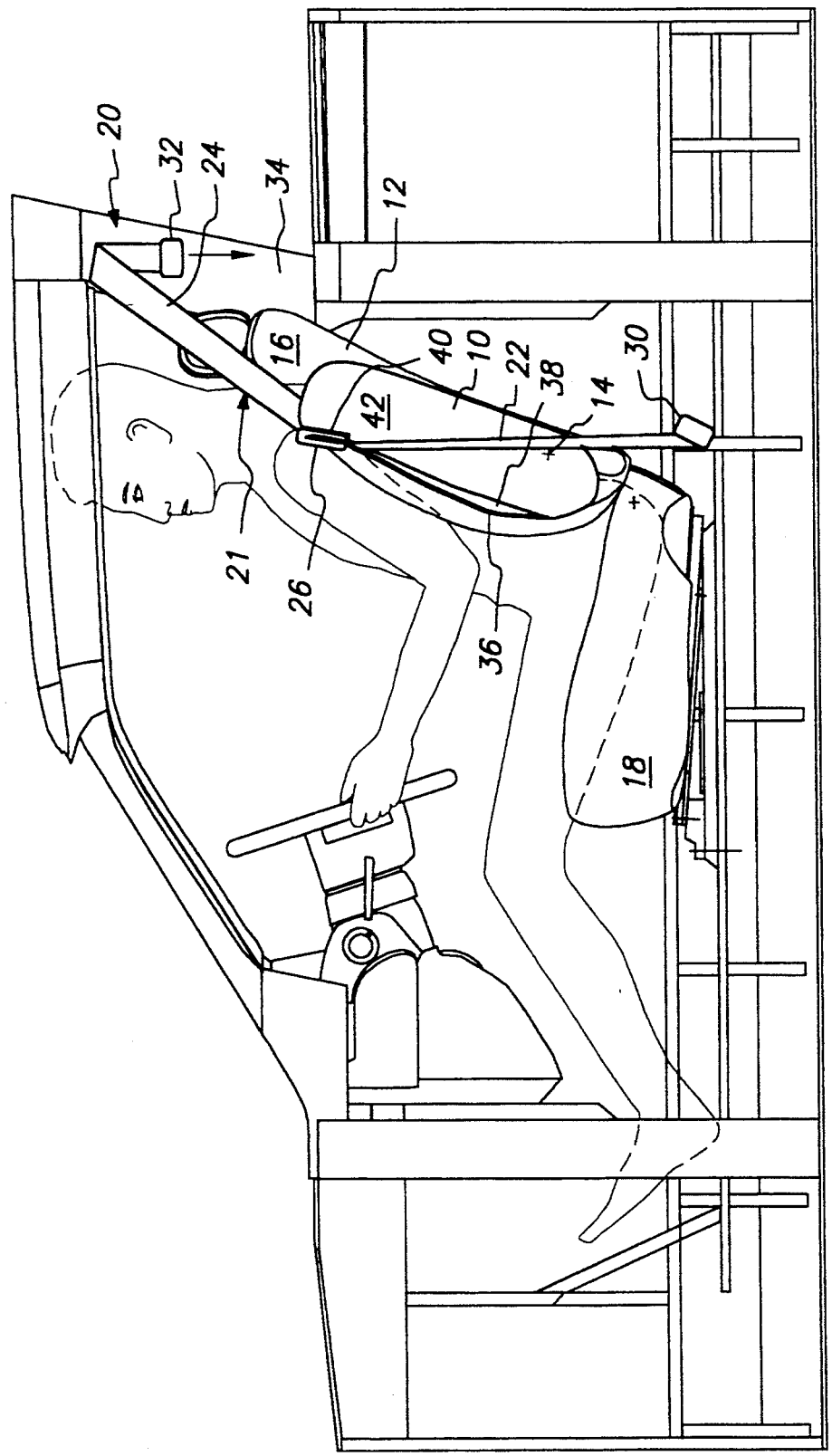
FIG. 1 is a side elevational view showing the inventive armrest in the retracted upright position.

The armrest 10 is mounted towards the side of the vehicle from which the seat belt or belts are retracted when not in use. This is usually the outboard side, as shown by the preferred embodiment in the figures. The armrest 10 is pivotally attached to the outboard side of seat 12 at pivot 14. FIGS. 1 and 4A show the armrest 10 in its upright retracted position alongside the seat back 16. FIGS. 2, 3, 5A and 6A show the armrest 10 in its lowered working position substantially parallel to and above the seat bottom 18.

A conventional lap and shoulder belt restraining arrangement is also shown in the figures. This seat belt system 20 includes a continuous belt 21 having a lap portion 22 and a shoulder portion 24, a single buckle 26 slidably received on the belt, a latching mechanism 28, a lap belt anchor 30, and a belt reel and tensioner 32. A buckle stop button 31 is carried by the belt beneath the buckle 26 to maintain the buckle in an elevated condition within reach of the occupant and prevent the buckle from sliding to the lower end of the belt.

Figure 3:
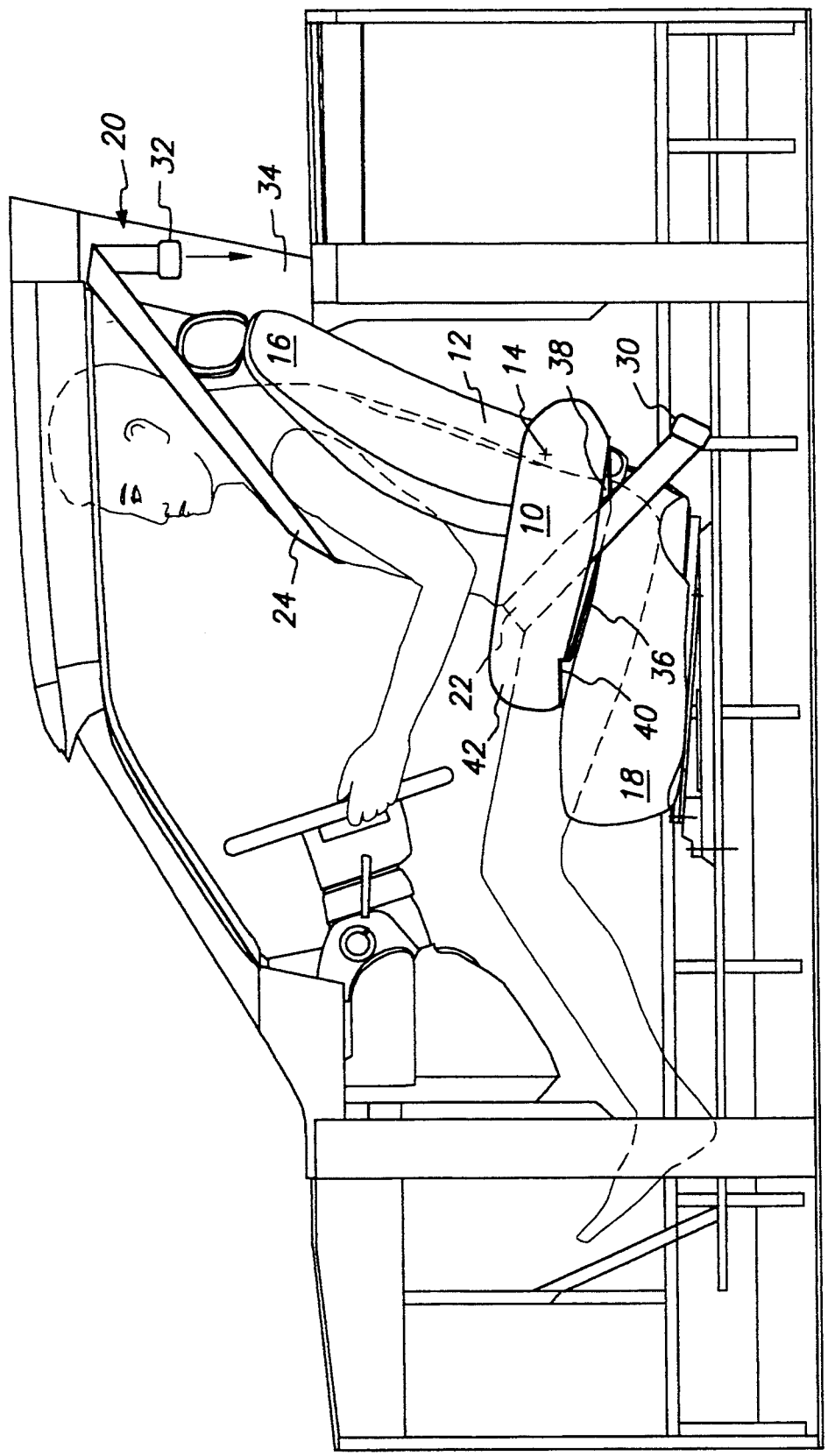
FIG. 3 is a side elevational view showing the inventive armrest in the lowered working position with the seat belt fastened.
Figure 4A:
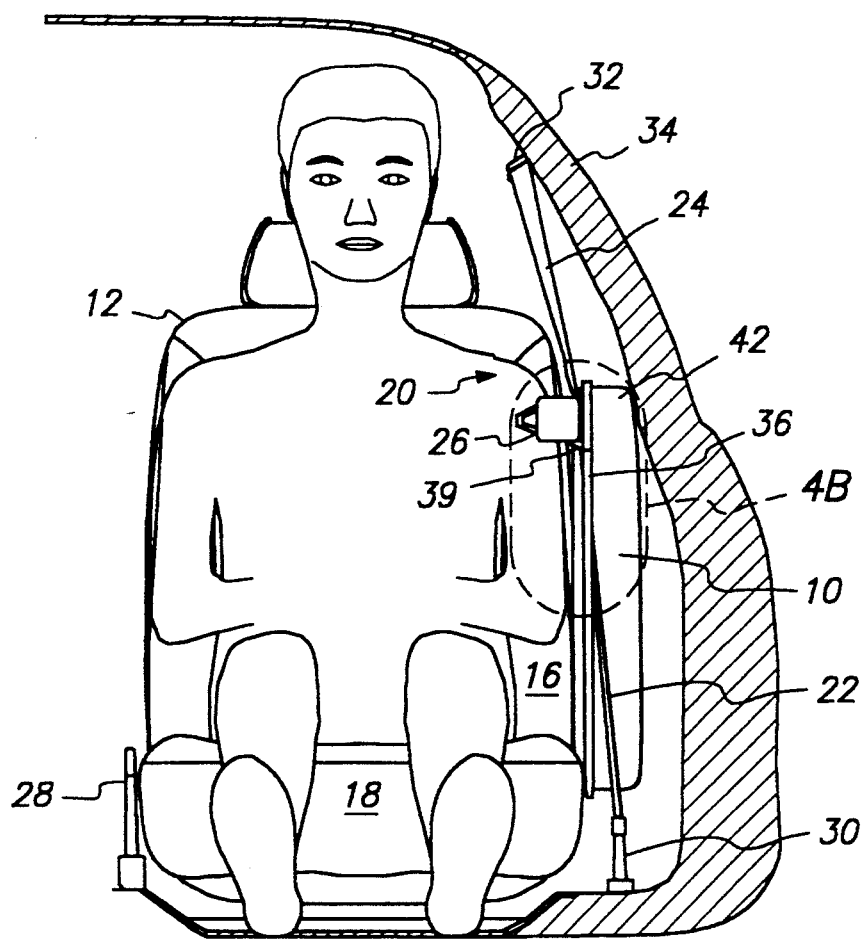
FIG. 4A is a front elevational view showing the inventive armrest in the retracted upright position.
Figure 6A:
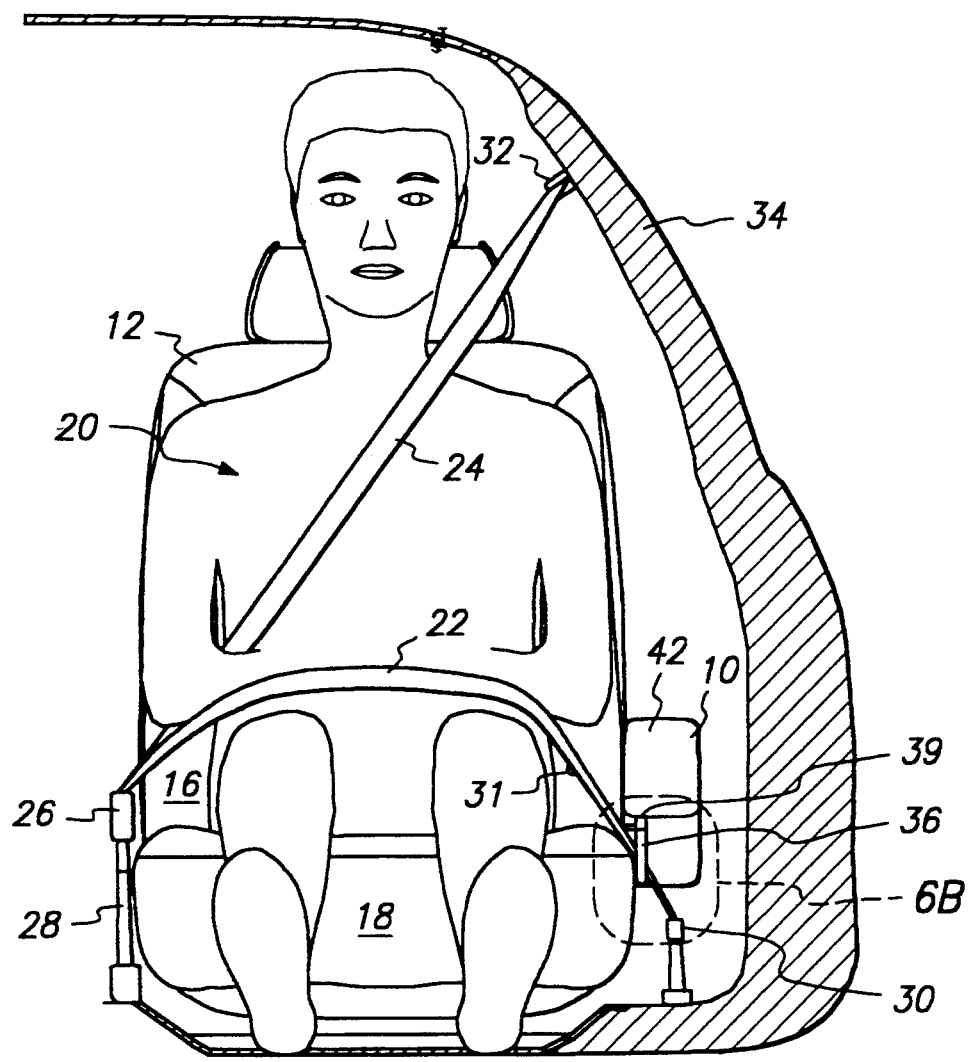
FIG. 6A is a front elevational view showing the inventive armrest in the lowered working position with the seat belt fastened.
Figure 6B:
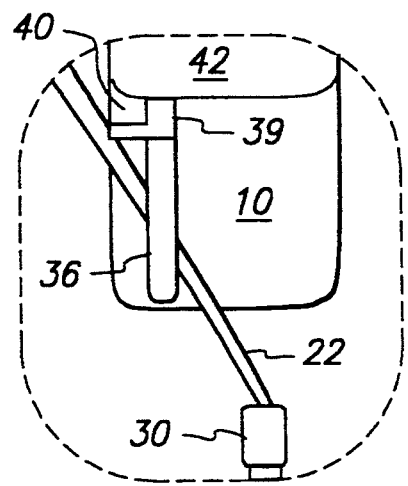
FIG. 6B is an enlarged partial view of FIG. 6A.
Figure 7:
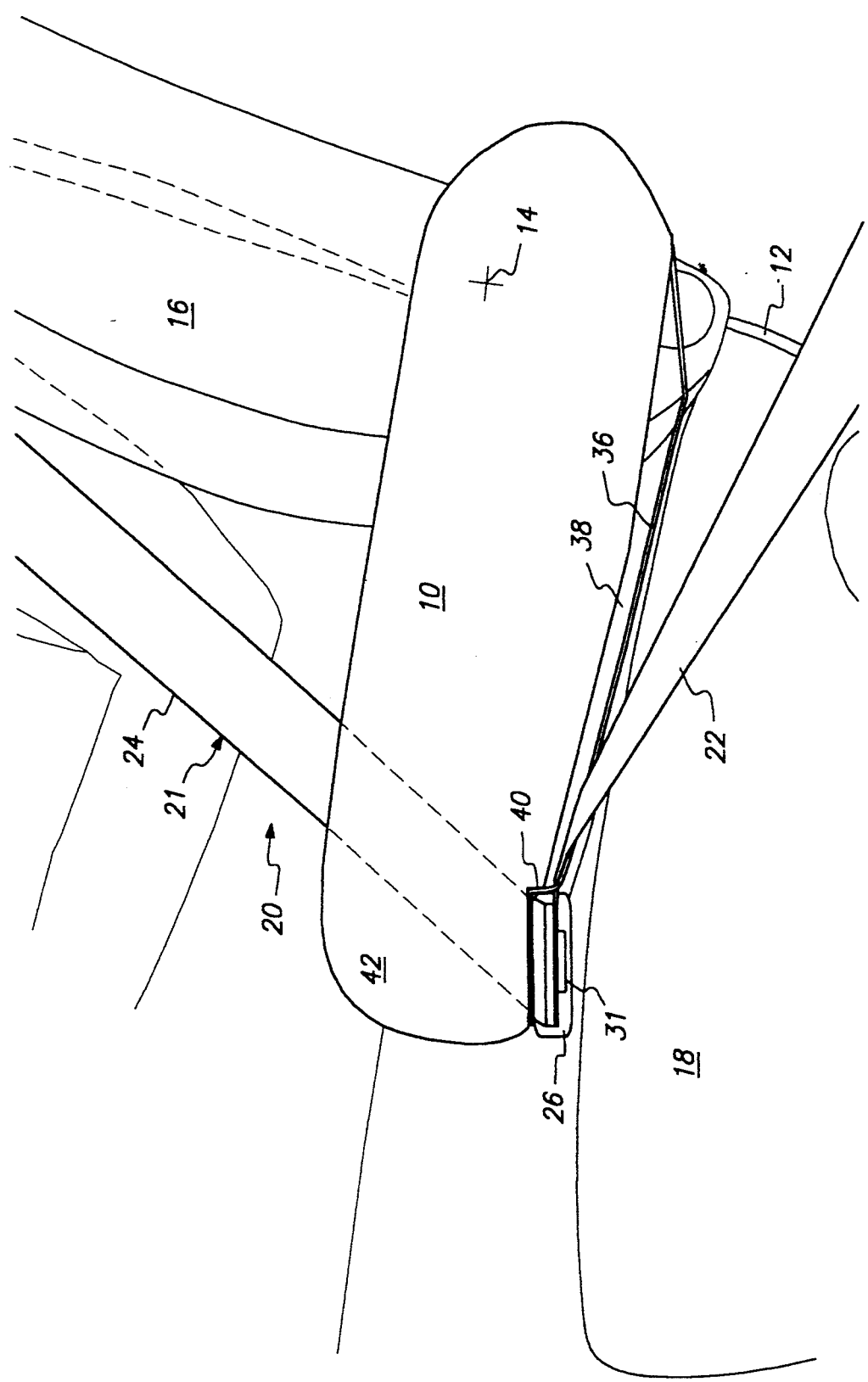
FIG. 7 is an enlarged partial view of FIG. 2.
Figure 8:
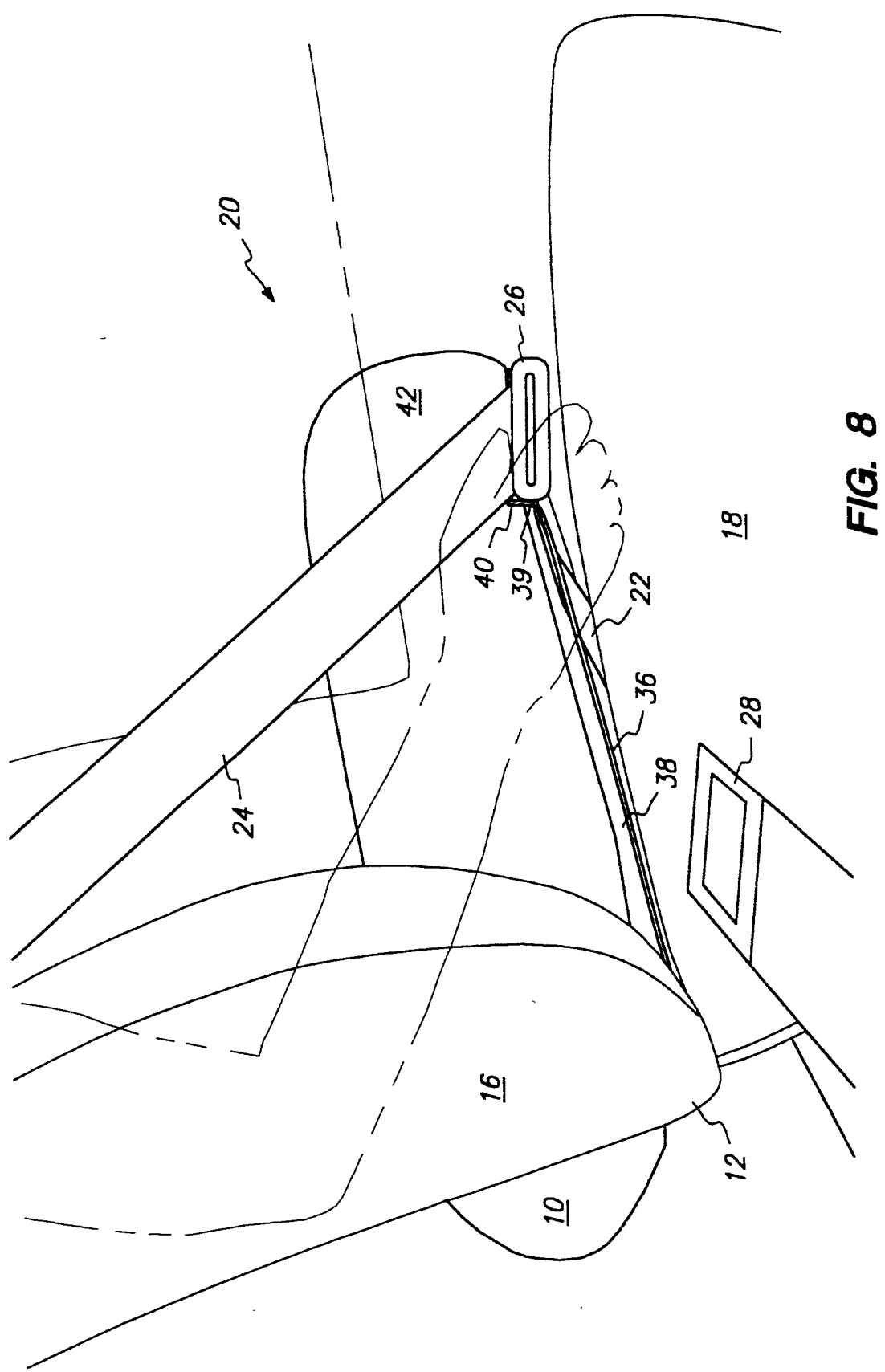
FIG. 8 is an opposite side view of FIG. 7.
Figure 9:
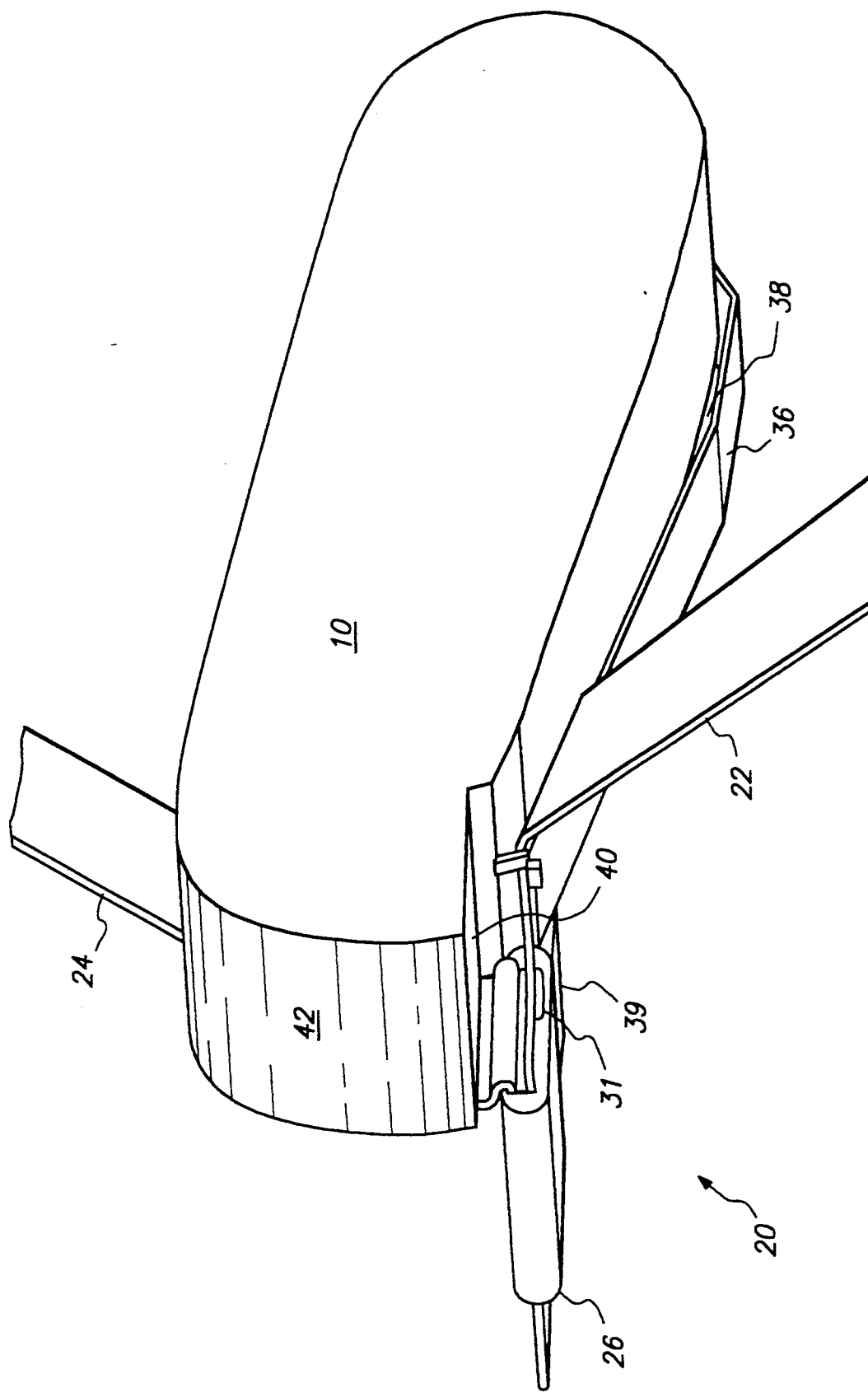
FIG. 9 is a lower frontal view of the outboard side of the inventive armrest with the seat belt buckle in the presentation position.

FIGS. 3 and 6A show the belt system 20 when fastened. Latching mechanism 28 is secured to the floor of the car body adjacent the rear inboard side of the seat 12. The latching mechanism 28 releasably retains complementary buckle 26. In use, belt portion 22 extends from buckle 26 over the waist of the occupant to the anchor 30, which is mounted on the floor outboard of seat 12 or in the lower rear portion of the door jamb. Shoulder belt portion 24 extends from buckle 26 diagonally up and across the occupant's torso to the shoulder belt reel and tensioner 32, which is mounted in the upper portion of the 'B' pillar 34 behind the door.

The shoulder belt reel and tensioner 32 operates in a conventional manner to keep lap belt portion 22 and shoulder belt portion 24 snug against the occupant's body while allowing the occupant some movement. Reel and tensioner 32 locks in the event of a collision to retain the occupant in seat 12. When the seat belt system 20 is not in use, buckle 26 is released from latching mechanism 28, and reel and tensioner 32 draws the lap belt portion 22 and shoulder belt portion 24 together with the buckle 26 towards the outboard side of the vehicle.

A belt guide 36, made of steel, hard plastic, or other structurally stiff material, extends along the lower edge of armrest 10. The belt 21 passes through the belt guide 36 and is slidably retained thereby. The gap 38 between belt guide 36 and the lower edge of armrest 10 is narrower than the thickness of buckle 26, thereby ensuring that buckle 26 always remains on the inboard side of armrest 10. Belt guide 36 allows the belt 21 to freely travel forward and back along the bottom of armrest 10, as shown in FIGS. 2 and 3.

Figure 4B:
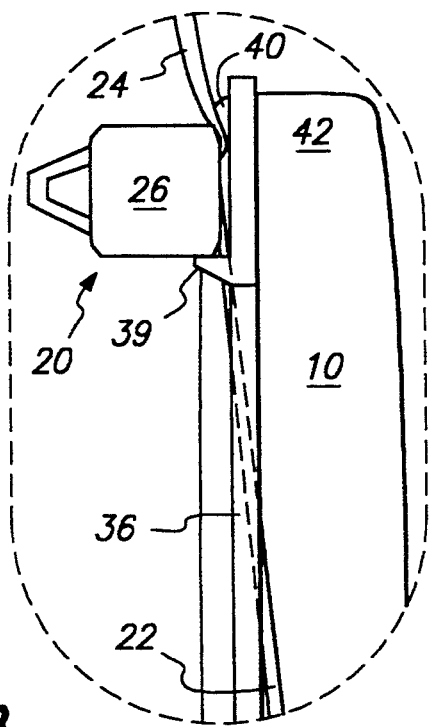
FIG. 4B is an enlarged partial view of FIG. 4A.
Figure 10:
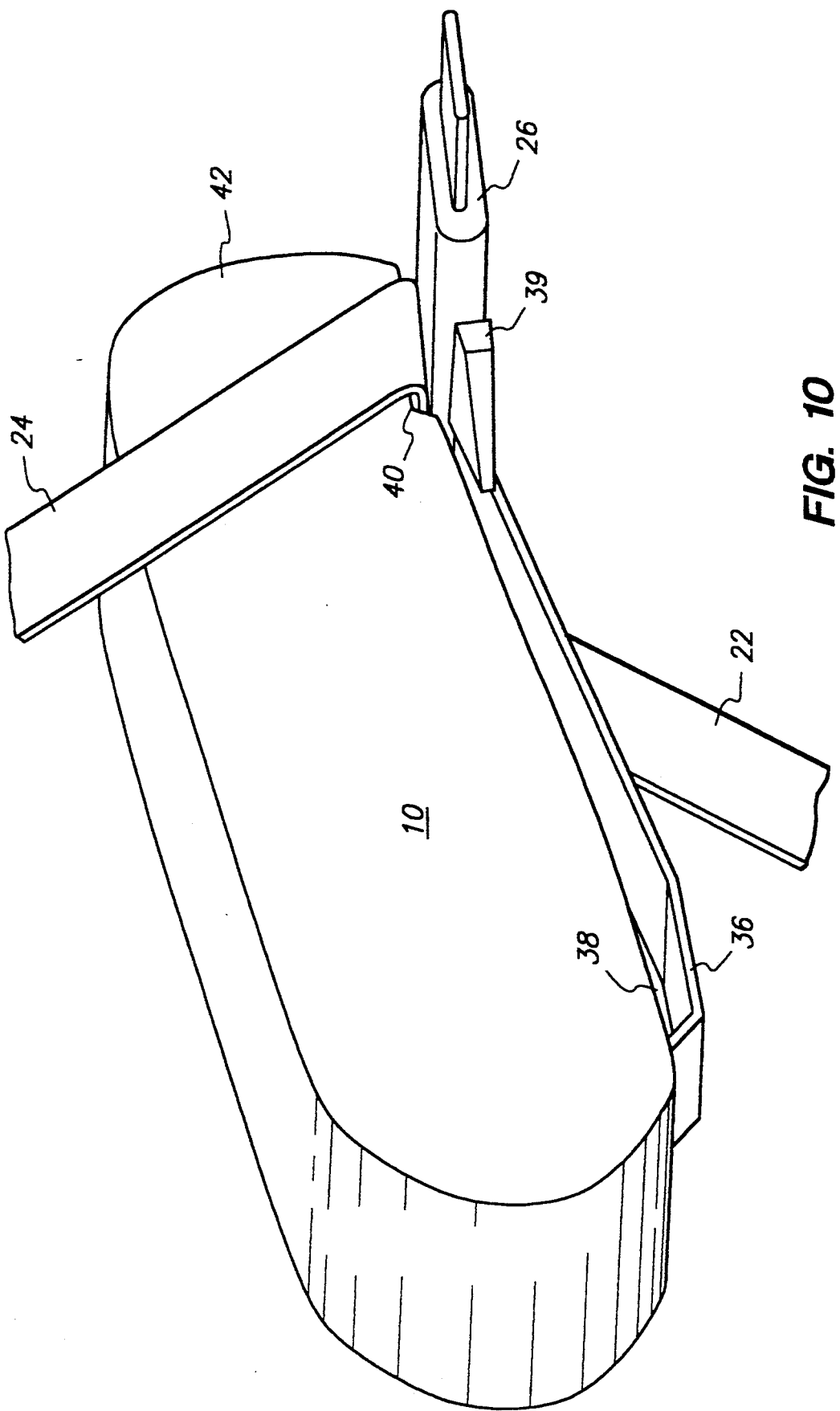
FIG. 10 is a rear side view of the inboard side of the inventive armrest with the seat belt buckle in the presentation portion.

Referring to FIGS. 4B and 10, a metal or hard plastic buckle retainer 39 is attached to the inboard side of lap belt guide 36 near the distal end 42 of armrest 10. The buckle retainer 39 is barb-shaped with a beveled rearward edge and a flat forward edge. This shape allows belt 21 and buckle 26 to travel forward over the buckle retainer but prevents buckle 26 from traveling rearward back over the buckle retainer 39. It also permits the belt 21 to slide rearwardly in the guide 36 when the buckle 26 is pulled from the retainer and engaged with the latching mechanism 28. A recessed detent 40 is formed in the bottom of the distal end 42 of armrest 10. Detent 40 has a shape complementary to buckle 26. Buckle retainer 39 and detent 40 cooperate to releasably retain buckle 26 in an inwardly protruding position at the distal end 42 of the armrest 10 for convenient presentation to the occupant.

Referring to FIGS. 1 and 4A, when the restraint system 20 is not in use and the armrest 10 is in the upright position, shoulder belt reel and tensioner 32 draws the belt 21 and buckle 26 upward and coils the excess shoulder belt 21 therein. Belt 21, buckle 26, and lap belt 22 slide upward along the armrest 10 until buckle 26 passes over buckle retainer 39 and lodges in detent 40. As the belt 21 is drawn into the tensioner, the stop button 31 engages the buckle 26 and draws it into the buckle retainer 39. In this retracted position, the restraint system 20 and the armrest 10 do not impede the occupant's ingress to or egress from the vehicle.

Figure 2:
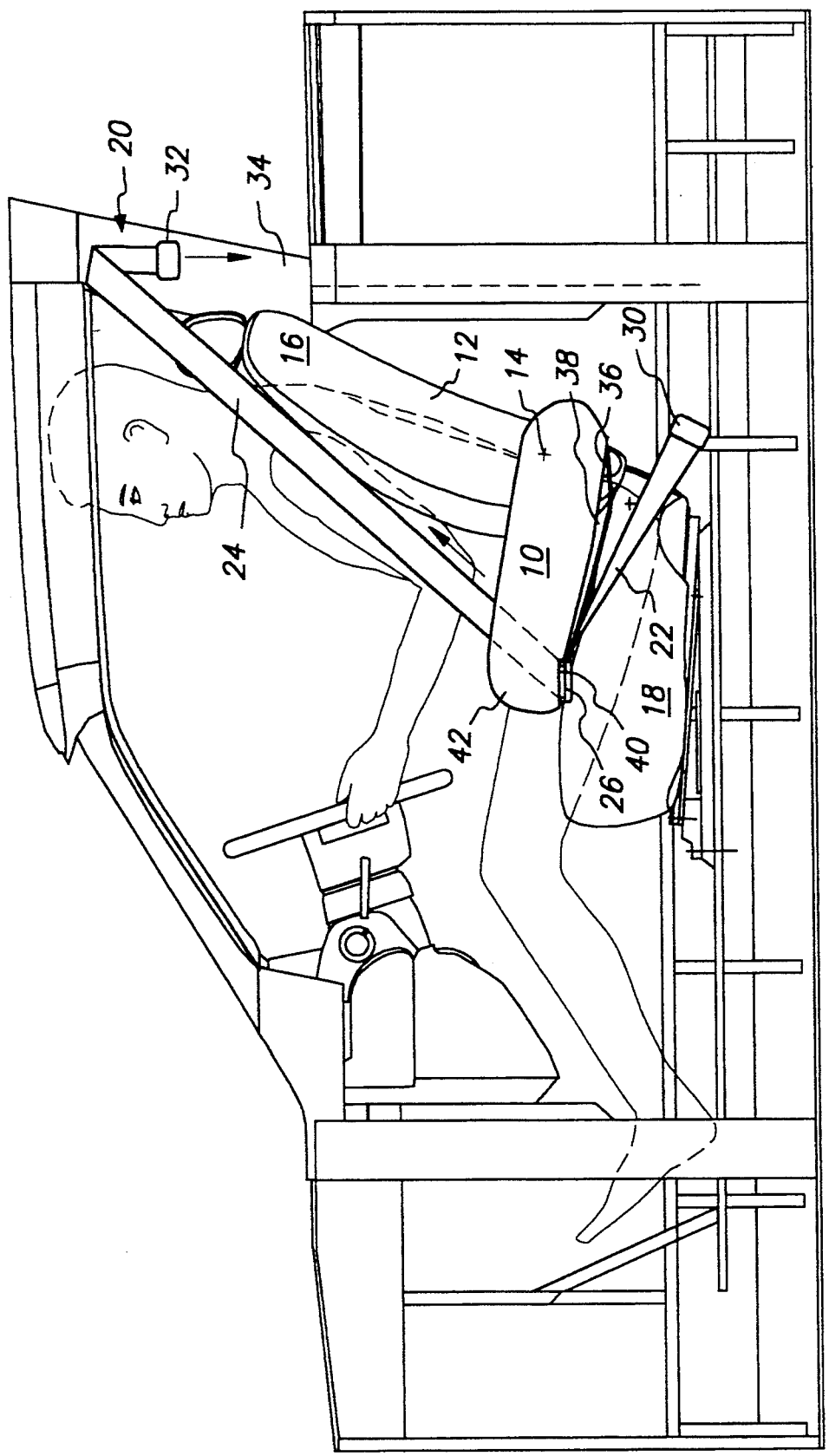
FIG. 2 is a side elevational view showing the inventive armrest in the lowered working position with the seat belt buckle being presented to the vehicle's occupant.
Figure 5A:
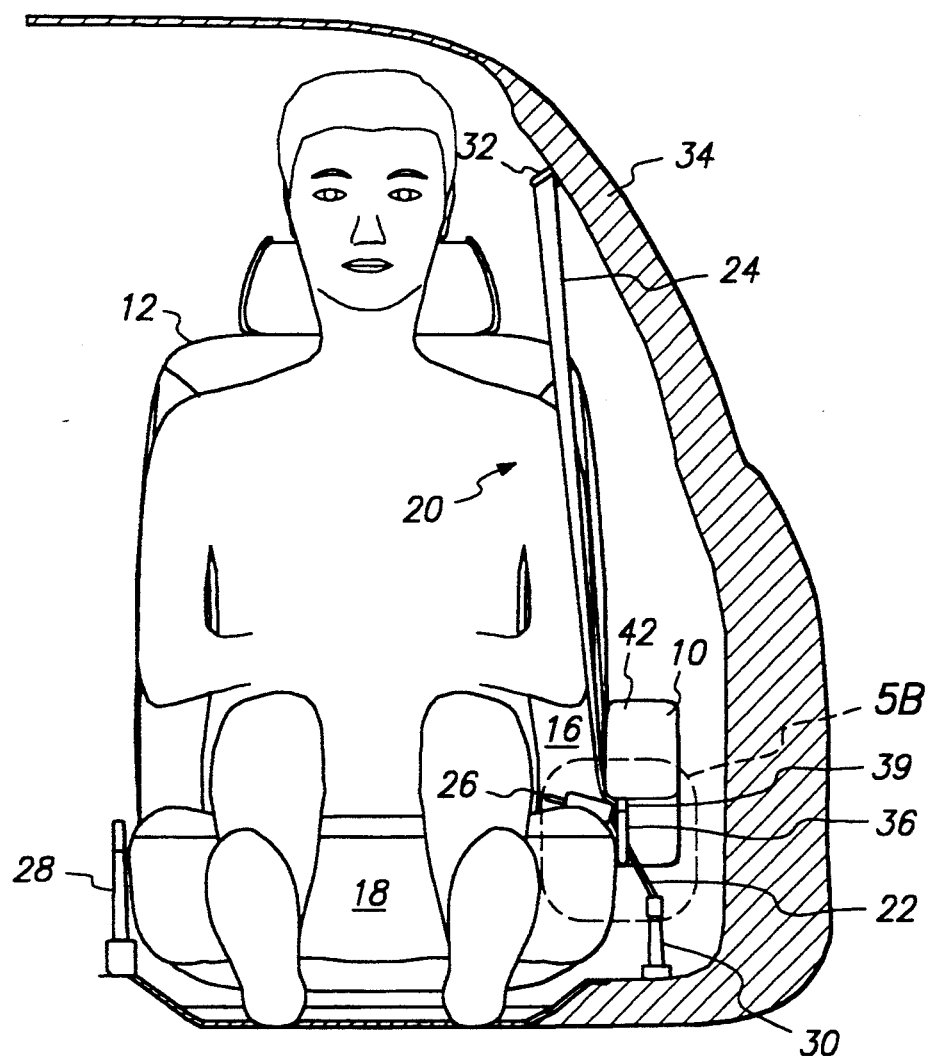
FIG. 5A is a front elevational view showing the inventive armrest in the lowered working position with the seat belt buckle being presented to the vehicle's occupant.
Figure 5B:
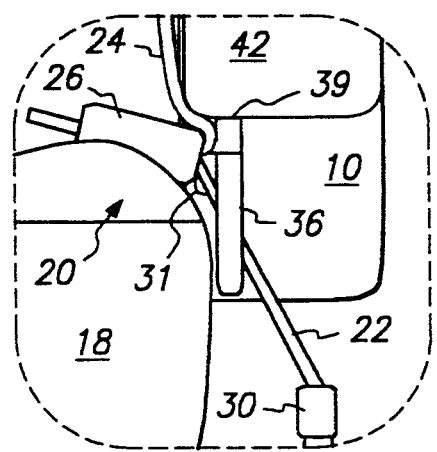
FIG. 5B is an enlarged partial view of FIG. 5A.

Referring to FIGS. 2 and 5A, as the armrest 10 is manually or automatically lowered from the upright position to the lowered working position shown, reel and tensioner unit 32 releases the required amount of belt 21, while keeping tension on the belt. Buckle 26 remains lodged in the detent 40 and behind buckle retainer 39 when the armrest 10 is in the lowered position so that the buckle 26 protrudes inwardly toward the occupant from the bottom side of the distal end 42 of the armrest 10. The occupant is able to clearly see and easily reach the belt buckle 26 from this position. The lower end of the belt 21 extends outward and rearward from the buckle 26, over the lap belt guide, and down to the anchor 30. The upper end of the belt 21 extends upward and rearward around the inboard side of the armrest 10 to the shoulder belt reel and tensioner 32.

When the occupant is ready to fasten the seat belt 21, he or she can easily grasp the belt buckle 26 (or alternatively a portion of the shoulder belt 24 adjacent to the buckle 26), pull the buckle 26 from the detent 40, and draw it around to the inboard side of the seat 12 for fastening to the latching mechanism 28. As the buckle 26 is drawn around to the inboard side of the occupant, the lap belt portion 22 slides rearward along the belt guide 36 to wrap around the occupant's waist, and the shoulder belt portion 24 wraps diagonally across the occupant's torso.

FIGS. 3 and 6A show the restraint system 20 when fastened. The restraint system 20 and armrest 10 are configured so that the belt 21, when fastened, freely passes through gap 38 between the armrest 10 and guide 36. In this position, belt system 20 operates as a conventional restraint system, and armrest 10 operates as a conventional armrest.

To exit the vehicle, the occupant releases the belt buckle 26 from the latching mechanism 28, and the armrest 10 is manually or automatically raised. This action resets the buckle 26 in the buckle retainer 39 and detent 40 as shown in FIG. 1 and described above.

In order to ensure that buckle 26 is able to reliably reset into the buckle retainer 39 and detent 40 each time the belt system 20 is unfastened and the armrest is raised, shoulder belt reel and tensioner 32 exerts sufficient force to ensure that buckle 26 rises to the top of the armrest 10 in the upright position and clears buckle retainer 39 to drop into detent 40.

Referring to FIG. 11, the armrest moves about 100 degrees between the upright position and the lowered position, as depicted by arrow 'A'. This motion can be accomplished manually by the occupant, or automatically by an armrest drive mechanism 44, shown in FIG. 12. Automatic armrest operation allows the seat belt to be automatically presented to the occupant and requires less effort when entering or exiting the vehicle. An electric motor 46 and gearbox 48 can be located in the seat back 16 at pivot point 14. The gearbox 48 drives a safety clutch 50 which in turn rotates an armrest driver 54, driving armrest 10 up or down. Safety clutch 50 has a spring loaded detent 52 within it so that if an outside pressure is exerted to the armrest 10 while the electric motor 46 is activated, the armrest 10 will remain in its present position as long as the force is applied. This means that if an arm or some other object is in the path of armrest 10 as it moves to or from its upright position, armrest 10 will stop its movement until the object has been removed. Safety clutch 50 also allows the armrest 10 to be lifted manually in the event of a power failure.

The orientation of the above drive arrangement could be reversed so that motor 46 and gearbox 48 are located within the armrest 10 and clutch 50 connects to the seat back 16. Alternately, the motor 46 and gearbox 48, or some other drive means, can be located elsewhere and connected to the armrest 10 through a cable arrangement or some other suitable mechanism.

The upward movement of armrest 10 could be triggered by a door open sensor, a seat belt unfastened sensor, or a combination of both. The downward movement of the armrest could be triggered by the door closing, an occupant controlled switch, or a combination of both. The use of an occupant controlled switch would allow the occupant to have the seat belt presented to him or her after unfastening the seat belt without opening the door, such as when paying bridge toll. The automatic operation of armrest 10 could easily be controlled by the same electronic controller that operates a vertically sliding door, which is the subject of the parent application of this continuation-in-part application.

Self contained seats are being developed in which the restraint system (including shoulder and lap belt portions, retracting units, buckle and latching mechanism and possibly a side impact air bag), armrests, etc., are built into the seat. This allows the automobile manufacturer to quickly install the seat/restraint unit at any one of a number of points along an assembly line, without having to coordinate the seat installation with upper and lower belt anchor points, belt retracting mechanisms, trim pieces, carpeting, etc., or have a restraint belt in the way of installing the seats or other items in the vehicle body. The restraint systems and armrests can more easily be installed in a complete seat assembly outside the vehicle, rather than inside a vehicle body traveling down an assembly line. The present invention readily lends itself to this type of configuration.

In alternative embodiments (not shown), the buckle retainer 39 and detent 40 could be replaced by other suitable buckle retaining means, such as a magnet (permanent or alternately powered electromagnet) located at the distal end 42 of armrest 10.

Of course, the present invention can also be configured so that the locations of the buckle 26 and the mating latching mechanism 28 are swapped. The latching mechanism would then be attached to the ends of lap belt 22 and shoulder belt 24 and the buckle 26 located on the inboard side of the seat 12. Buckle retainer 39 and detent 40 would then hold the latching mechanism 28, rather than the buckle 26.

The above descriptions and drawings are for illustrative purposes only, and are not exhaustive of possible alternative embodiments of the invention. It is to be understood that the present invention is not limited to the sole embodiments described above and illustrated herein, but encompasses any and all variations falling within the scope of the appended claims.

What is claimed as the invention is:

1. A restraint system presentation apparatus for presenting a restraint belt buckle to a vehicle occupant, the apparatus comprising:

an armrest retractable to an upright position and lowerable to a working position;

belt buckle retaining means for releasably retaining the belt buckle on the armrest in a position conveniently accessible to the occupant when the armrest is in the working position, the retaining means allowing the occupant to release the belt buckle therefrom and operate the restraint system; and resetting means for automatically replacing the belt buckle in the retaining means when the restraint system is not in use and the armrest is retracted in the upright position.

2. A restraint system presentation apparatus for presenting a portion of a restraint belt to a vehicle occupant, the apparatus comprising:

an armrest retractable to an upright position and lowerable to a working position;

belt retaining means for releasably retaining the belt portion on the armrest in a position conveniently accessible to the occupant when the armrest is in the working position, the retaining means allowing the occupant to release the belt therefrom and operate the restraint system; and resetting means for automatically replacing the belt portion in the retaining means when the restraint system is not in use and the armrest is retracted in the upright position.

3. A restraint system presentation apparatus as claimed in claim 2 wherein the armrest has a proximal end and a distal end, the armrest being pivotally attached at its proximal end to a seat and movable therewith, and wherein the retaining means is located adjacent the distal end of the armrest.

4. A restraint system presentation apparatus as claimed in claim 3 further comprising belt guiding means for captively allowing the belt to slide rearward along the armrest toward the proximal end adjacent the occupant's waist when the belt buckle is released from the retaining means in the working position, and wherein the guiding means captively allows the belt to slide upward along the armrest toward the distal end when the armrest is in the upright position.

5. A restraint system presentation apparatus as claimed in claim 1 wherein the armrest includes a driver means for automatically lowering the armrest into the working position to present the belt buckle to the occupant when a vehicle door is first closed, and for automatically retracting the armrest into the upright position to reset the belt buckle in the resetting means when then the restraint system is not in use and the door is opened.

6. A restraint system presentation apparatus as claimed in claim 1 wherein the buckle retaining means comprises a recessed detent portion of complementary size and shape to the buckle, located on a lower forward inboard end of the armrest.

7. A restraint system presentation apparatus as claimed in claim 1 wherein the buckle retaining means comprises a finger inwardly protruding from adjacent a distal end of the armrest, the finger having a barbed shape for allowing the belt buckle to slide forward over the finger towards the distal end of the armrest, and retaining the belt buckle forward of the finger until inwardly released by the occupant.

* * * * *